Feb. 7, 1950

A. C. COUTANT ET AL 2,496,986

TRIPOD WITH BALL-AND-SOCKET JOINT

Filed Dec. 13, 1946

INVENTORS
Andre Clement Coutant,
Jacques Mathot
By Robert E. Burns
ATTORNEY

UNITED STATES PATENT OFFICE 2,496,986

TRIPOD WITH BALL-AND-SOCKET JOINT

André Clément Coutant and Jacques Mathot,
Paris, France

Application December 13, 1946, Serial No. 716,036
In France December 28, 1945

1 Claim. (Cl. 248—181)

This invention relates to tripods provided at the head thereof with a support mounted on a ball-and-socket joint designed to allow the camera or the like intended to be secured on said support being swung round and titled in all directions.

In some tripods of that kind the ball is embraced in a substantially hemispherical socket and it sometimes happens that difficulties are encountered in swivelling the same on account of dust particles having found their way between the bearing surfaces; in particular, where the apparatus in used on roads, its operation is frequently checked by mineral particles raised in the air.

According to this invention, this inconvenience is avoided by virtue of a special arrangement of the ball and the members on which same is borne.

With this end in view, the bearing points of the hemispherical ball are reduced to three small studs preferably made of plastics which are secured on the head of the tripod and on which said ball can be pressed with the aid of a bolt arranged coaxially with said head; one end of said bolt rests with its ball-shaped surface in a correspondingly shaped surface concentric with the ball, the shaft of the bolt projecting freely through a conical recess in the ball which flares out sufficiently to enable tilting the latter as desired; finally, the lower end of the bolt is screwed in the tripod head, or carries a nut by whose engagement with the lower side of said head the ball can be pressed tightly against said studs for the purpose of retaining it in any desired position, or else said bolt is moved vertically by any suitable intermeshing or like gear.

In these conditions the operation is no longer liable to be interfered with by the presence of dust or foreign bodies between the bearing surfaces.

An embodiment of a tripod arranged in this manner is shown in the drawing appended hereto by way of example.

Figure 1:
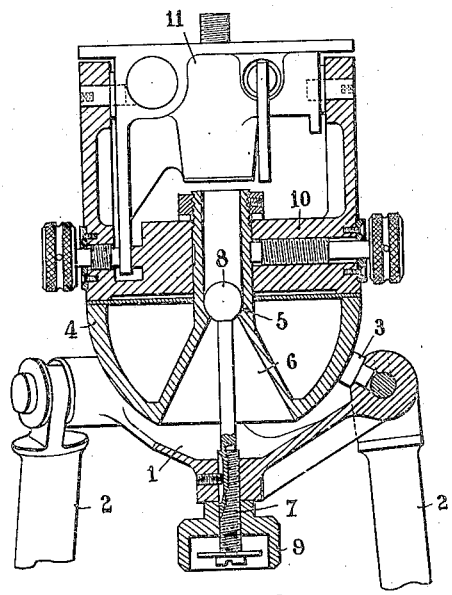
Figure 1 is an axial sectional view of the tripod head.
Figure 2:
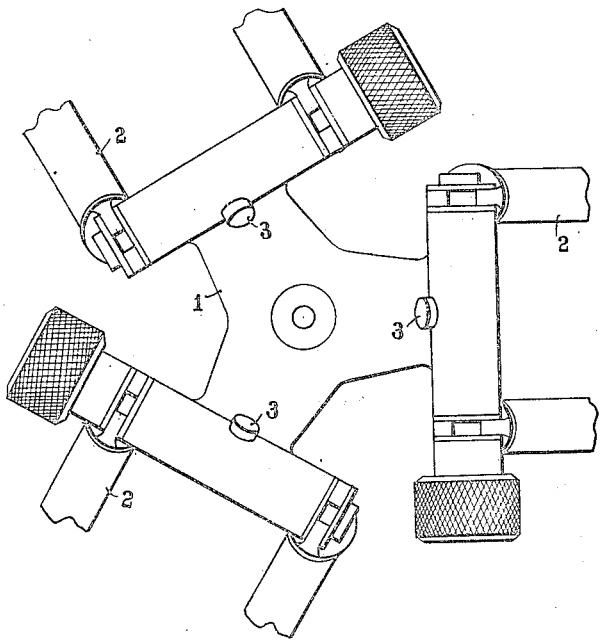
Figure 2 is a plan view of the head alone.

1 designates the head, which is of any suitable shape and is supported by the legs 2; secured on it at three points located at the apices of a triangle are studs 3 made of plastics and suitably inclined towards the centre; bearing on said studs is the hemispherical surface of the ball 4 in whose axis there are provided a hemispherical recess 5 concentric with the surface of the ball and a conical recess 6 that flares out from the bottom of recess 5 and through which the tightening bolt 7 projects.

The latter is formed with a spherical head 8 that fits in the recess 5 and carries a nut 9 seated on the bottom face of the head.

Mounted on top of the ball is a support 10 swingable about an axis that coincides with that of the ball; pivoted on said support about an axis at right angles to the aforementioned ones is a further support 11 on which the picture-taking camera or the like is secured.

It is to be understood that the invention is independent of the shape and arrangement of that portion of the head 1 which carries the bearing points 3 and also of the supports 10 and 11. Besides, in some instances, the latter may be done away with, the top of the ball then being adapted to directly receive the apparatus to be used.

What we claim is:

A tripod with a ball-and-socket joint designed to allow the apparatus mounted thereon being swung round and tilted in all directions, comprising a head, three pins arranged in a triangle carried by said head each as a hinge for one leg of the tripod, a stud on each pin to serve as a rest for the ball, means to alter the position of the ball on the studs and means to retain said ball in the desired position on said studs.

ANDRÉ CLÉMENT COUTANT.
JACQUES MATHOT.

REFERENCES CITED

The following references are of record in the file of this patent:

UNITED STATES PATENTS

| Number | Name | Date |
|---|---|---|
| 362,384 | Johnson | May 3, 1887 |
| 696,167 | Forester | Mar. 25, 1902 |
| 1,288,461 | Akeley | Dec. 24, 1918 |